April 21, 1925.
H. JOSEPH
RUBBER FABRICATION
Original Filed April 16, 1921
FIG. 1.
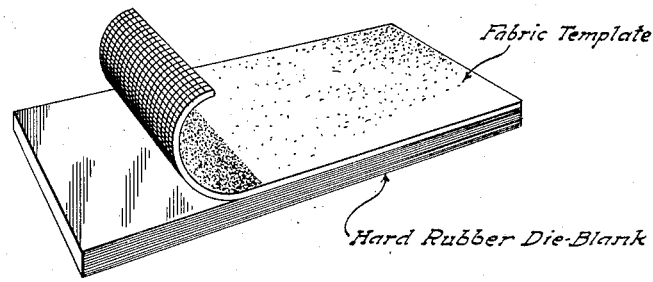
FIG. 2.
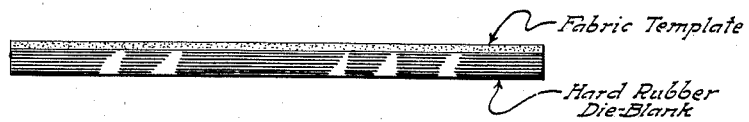
FIG. 3.
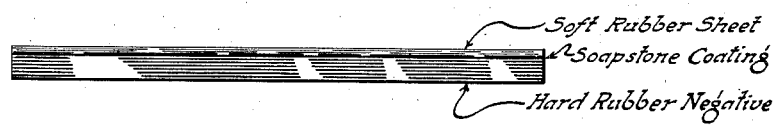
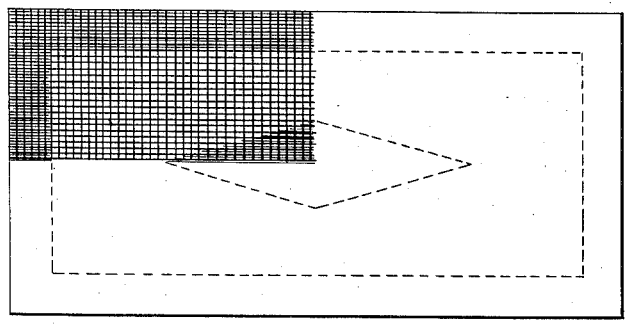
FIG. 4.
Inventor:
Henry Joseph.
By:
Erwin, Wheeler & Woolard.
Attorneys.
Witness:

Patented Apr. 21, 1925.

1,534,527

UNITED STATES PATENT OFFICE.

HENRY JOSEPH, OF GRAYLING, MICHIGAN, ASSIGNOR, BY MESNE ASSIGNMENTS, TO TUCKER RUBBER CORPORATION, OF BUFFALO, NEW YORK.

RUBBER FABRICATION.

Application filed April 16, 1921, Serial No. 461,791. Renewed September 8, 1924.

*To all whom it may concern:*

Be it known that I, HENRY JOSEPH, a citizen of the United States, residing at Grayling, in the county of Crawford and State of Michigan, have invented certain new and useful Improvements in Rubber Fabrication, of which the following is a full, clear, and exact description.

My invention relates to rubber fabrication and the principal object of my invention is to provide new and improved rubber products and new and improved methods of making such products. In this application I have described, for purposes of illustration, one such product and one such method, and I have chosen for that product a rubber fabric designed as a covering, and for that method a method particularly suited to the manufacture of the selected product.

In the drawings accompanying this specification and forming a part thereof:

Figure 1 is a perspective view showing a hard-faced but pliable woven textile fabric superimposed upon a blank of uncured hard rubber preparatory to the application of pressure and vulcanizing heat, Figure 2 is a side view of the elements shown in Figure 1.

Figure 3 is a side view showing the hard rubber negative thus produced with a sheet of soft rubber placed thereon preparatory to the application of pressure in the operation of vulcanizing the soft rubber sheet, while Figure 4 is a plan view of one form of improved rubber fabric produced by this method.

In carrying out the herein described process I apply a sheet of woven textile fabric to hard rubber material of suitable thickness and of facial dimensions approximating those of the soft rubber fabric to be produced, and then vulcanize the hard rubber material in contact with the textile fabric and under pressure to thus produce a hard rubber negative wherein the undulations of the threads of the fabric are exactly reproduced in negative form. I then place upon this hard rubber negative a sheet of uncured soft rubber of suitable thickness and dimensions and cure this soft rubber sheet in contact with the hard rubber negative and under pressure to thus permanently and completely transfer the fabric design from the hard rubber negative to the sheet of soft rubber.

By this means I produce a rubber fabric of the type shown in Figure 4 having a surface upon which the design of the woven fabric is clearly simulated and reproduced.

The face of the rubber fabric may be further ornamented by applying before vulcanization and in any desired order and position strips or figures of thin rubber which may be of selected colors and which become an integral part of the soft rubber fabric in the subsequent vulcanization operation yet produce on the finished rubber fabric attractive borders or designs contrasting with the body of the rubber fabric.

The practice of the herein described process enables me to produce at low cost a pliable sheet of soft rubber fabric resembling perfectly a selected textile fabric, possessing very decided advantages over the fabric which it simulates particularly in affording no place for the lodgment of germs and in permitting cleansing by merely washing of the surface, and at the same time possessing attractive ornamentation in a degree heretofore unknown in rubber fabrics.

I have described herein one product and one method both illustrating my invention. Those skilled in the art will readily realize that my invention is applicable to other products and that both the product and method herein described may be variously changed without departing from the scope of my invention or sacrificing the advantages thereof. It will therefore be understood that the description herein is illustrative only and that my invention is not limited thereto.

I claim:

1. The process of producing a sheet rubber fabric having on the face thereof a positive reproduction of a textile fabric, which consists in impressing upon the face of a sheet of uncured hard rubber the superficial characteristics of a textile fabric, vulcanizing the said hard rubber sheet so as to produce a negative of the textile fabric, applying a sheet of uncured soft rubber to the negative, and vulcanizing the said sheet of soft rubber to form on the face thereof the positive design of the textile fabric.

2. The process of manufacturing a sheet rubber fabric having a face ornamentation comprising a positive reproduction of a textile fabric, which process consists in forming a negative by impressing upon the face of a sheet of uncured hard rubber the superficial characteristics of a textile fabric, vulcanizing the said hard rubber sheet so as to produce a fixed negative of the textile fabric, arranging upon the negative colored strips of uncured soft rubber to produce designs as desired upon the completed fabric and covering the negative with a sheet of uncured soft rubber, and then vulcanizing the said sheet of soft rubber to unite the colored strips and the sheet of soft rubber to form a vari-colored fabric having on the face thereof the positive design of the textile fabric in which the crossing of the warp and weft threads is sharply delineated.

3. The method of producing a negative for the production of rubber fabrics, which consists in impressing a pliable fabric upon a sheet of uncured hard rubber to reproduce in the uncured rubber sheet the reverse of such fabric, and vulcanizing the uncured hard rubber sheet while under pressure to fix the impression of the fabric.

4. The process of producing a sheet rubber fabric having on the face thereof a positive reproduction of a textile fabric, which consists in impressing upon the face of a sheet of uncured hard rubber the superficial characteristics of a textile fabric, vulcanizing the said hard rubber sheet so as to produce a negative of the textile fabric, covering the face of the negative with a non-adherent, applying a sheet of uncured soft rubber to the negative, and vulcanizing the said sheet of soft rubber to form on the face thereof the positive design of the textile fabric.

5. The process of manufacturing a sheet rubber fabric having a face ornamentation comprising a positive reproduction of a textile fabric, which process consists in forming a negative by impressing upon the face of a sheet of uncured hard rubber the superficial characteristics of a textile fabric, vulcanizing the said hard rubber sheet so as to produce a fixed negative of the textile fabric, covering the face of the negative with a non-adherent, arranging upon the negative colored strips of uncured soft rubber to produce designs as desired upon the completed fabric and covering the negative with a sheet of uncured soft rubber, and then vulcanizing the said sheet of soft rubber to unite the colored strips and the sheet of soft rubber to form a vari-colored fabric having on the face thereof the positive design of the textile fabric in which the crossing of the warp and weft threads is sharply delineated.

6. The process of producing a sheet rubber fabric having on the face thereof a fac-simile reproduction of a textile fabric, which consists in impressing upon a sheet of uncured soft rubber a negative impression of the fabric to form a positive, and vulcanizing the rubber sheet to fix the positive of the fabric thus formed.

7. The process of producing a sheet rubber fabric having on the face thereof a fac-simile reproduction of a textile fabric, which consists in forming a negative impression of the fabric, pressing such negative upon a sheet of uncured rubber to form a positive of the fabric, and vulcanizing the rubber sheet to fix the positive thus formed.

8. The process of producing a sheet rubber fabric having on the surface thereof a fac-simile reproduction of a textile fabric, which consists in creating a negative impression of the positive of the fabric and permanently fixing such impression, pressing the negative thus formed upon a sheet of uncured rubber, and vulcanizing the rubber sheet to fix the positive thus formed.

9. The process of producing a sheet rubber fabric having an exposed surface formed as a replica of a textile fabric in which the crossing of the warp and weft threads is sharply delineated, which consists in the steps of forming a negative by impressing a pliable fabric template upon a sheet of uncured hard rubber, vulcanizing such sheet to fix the negative, impressing such negative upon a sheet of uncured soft rubber to form a positive of the fabric template, and vulcanizing the sheet of soft rubber to fix the positive impression thereon.

10. A pliable rubber fabric having upon the face thereof the positive simulation of a textile fabric, and ornamented by colored strips of rubber incorporated as integral parts of the said rubber fabric.

11. As a new article of manufacture, a sheet rubber fabric having upon the surface thereof a replica of a woven fabric in which the crossing of the strands is sharply delineated in a positive manner.

12. As a new article of manufacture, a sheet rubber fabric having upon the face thereof a positive reproduction of the arrangement of the warps and wefts of a textile fabric in which the crossing of the threads is sharply delineated, and ornamented by colored strips of rubber incorporated as integral parts of the rubber fabric.

13. As a new article of manufacture, a sheet rubber fabric having upon the surface thereof a positive reproduction of the arrangement of the warps and wefts of a woven fabric in which the crossing of the threads is sharply delineated, and ornamented additionally by colored strips of rubber incorporated as integral parts of the rubber fabric, the replica of the textile fabric covering the whole of the surface of the rubber fabric.

14. As a new article of manufacture, a sheet rubber fabric for use as a covering, having upon its surface a ground of one color and ornamental figures of another color, the surface of the rubber fabric being produced in positive simulation of a textile fabric in which the arrangement of the component threads is delineated as a positive replica of the textile fabric.

15. As a new article of manufacture, a sheet rubber fabric for use as a covering, having upon its surface a ground of one color and ornamental figures of another color, the ground surface of the rubber fabric being produced in positive simulation of a textile fabric in which the arrangement of the component threads is delineated as a positive replica of the textile fabric.

16. A rubber product having at least a part of the surface formed as an accurate positive simulation of the surfacing of a textile material.

17. A rubber covering having at least a part of its surface formed as an accurate positive simulation of the surfacing of a textile material.

18. A rubber mat having at least a part of its surface formed as an accurate positive simulation of the surfacing of a textile material.

19. The method of forming, on at least a part of the surface of a rubber product, an accurate simulation of the surfacing of at least a part of an existing covering, which comprises applying hard rubber material to the corresponding surface of the covering, and vulcanizing such material into hard rubber in contact with such surface.

20. The method of forming, on at least a part of the surface of a rubber product, an accurate simulation of the surface of at least a part of an existing covering, which comprises applying hard rubber material to the corresponding surface of the covering, and vulcanizing such material into hard rubber in contact with such surface to thus form a mold member available for use in vulcanizing the corresponding portion of the product.

21. The method of forming, on at least a part of the surface of a rubber product, an accurate simulation of the surfacing of at least a part of an existing textile article, which comprises applying a hard rubber material to the corresponding surface of the textile article, and vulcanizing such material into hard rubber in contact with such surface.

22. The method of forming, on at least a part of the surface of a rubber product, an accurate simulation of the surfacing of at least a part of an existing textile article, which comprises applying hard rubber material to the corresponding surface of the textile article, and vulcanizing such material into hard rubber in contact with such surface to thus form a mold member available for use in vulcanizing the corresponding portion of the product.

In testimony whereof, I have signed my name at Chicago, Ill., this 28th day of February, 1921.

HENRY JOSEPH.

Witnesses:
JAMES A. CROTTY,
JOHN W. CROTTY.